United States Patent [19]
Ohnishi

[11] 3,901,338
[45] Aug. 26, 1975

[54] STEERING DEVICE OF WIRELESS CONTROL TRACTOR

[75] Inventor: Nobuo Ohnishi, Osaka, Japan

[73] Assignee: Kabushiki Kaisha Komatsu Seisakusho, Tokyo, Japan

[22] Filed: May 30, 1973

[21] Appl. No.: 365,210

[30] Foreign Application Priority Data
May 31, 1972 Japan.............................. 47-63315
May 31, 1972 Japan.............................. 47-63316

[52] U.S. Cl.................... 180/6.7; 91/49; 192/13 R; 91/49
[51] Int. Cl............................................ B62d 11/08
[58] Field of Search ............... 180/6.2, 6.7; 303/13; 192/13 R

[56] References Cited
UNITED STATES PATENTS

| | | | |
|---|---|---|---|
| 2,444,279 | 6/1948 | Bruce | 91/49 X |
| 2,468,628 | 4/1949 | Henning | 180/6.7 X |
| 3,494,449 | 2/1970 | Umeda et al. | 180/6.2 X |
| 3,595,352 | 7/1971 | Todeschini | 180/6.7 X |

FOREIGN PATENTS OR APPLICATIONS

| | | | |
|---|---|---|---|
| 1,119,685 | 7/1968 | United Kingdom | 180/6.7 |

Primary Examiner—David Schonberg
Assistant Examiner—John A. Pekar
Attorney, Agent, or Firm—Oblon, Fisher, Spivak, McClelland & Maier

[57] ABSTRACT

A steering device is provided for a wireless tractor control which has a turning lever, a steering clutch connected to the turning lever through a loose spring, a pneumatic cylinder connected to the turning lever, a multiplier having a lever connected to the turning lever through a brake operating linkage, a piston having a drain hole open to a pressure chamber and contacted with a brake lever of a brake body at the end thereof and a rod for opening and closing the drain hole of the piston by movement of the lever, a brake cylinder connected to the brake operating linkage to be operated by the urging force of the spring only when the supply of compressed air is shut off, and a slow turning valve connected to the hydraulic circuit from the brake booster communicating with the pressure chamber of the multiplier for varying the relief set pressure through the supply of the compressed air, whereby the tractor may be slowly turned.

3 Claims, 3 Drawing Figures

STEERING DEVICE OF WIRELESS CONTROL TRACTOR

BACKGROUND OF THE INVENTION

1. Field of the Invention

This invention relates to an improved steering device for a wireless tractor control unit.

2. Description of the Prior Art

When a conventional wireless tractor, such as a bulldozer, is steered in a manner to be turned for changing its direction of travel, a change-over valve is first switched by a wireless control device, such as a radio, so as to feed compressed air into a clutch operating cylinder for turning the tractor to operate a steering clutch lever in order to disengage the steering clutch, then compressed air supplied to a brake operating cylinder is the same operation shut off so as to brake by means of a spring in the cylinder, thereby to turn the tractor, but since the urging force of the spring in this case is set to a tension which possibly may abruptly stop the tractor, the turning of the tractor is very quick with the result that slow turning cannot be satisfactorily executed.

SUMMARY OF THE INVENTION

It is therefore an object of the present invention to provide a steering device for a wireless tractor control which permits slow turning of the tractor.

It is another object of the present invention to provide a slow turning valve for the steering device of a wireless tractor control.

It is still another object of the invention to provide a slow turning valve for the steering device of a wireless tractor control which so operates as to set a relief set pressure very low when the set pressure drops and to set it very high when the set pressure is increased to normal.

The foregoing and other objects are achieved, according to one aspect of the present invention, through the provision of a steering device for a wireless tractor control which comprises a turning lever, a steering clutch connected to the turning lever through a loose spring, a pneumatic cylinder connected to the turning lever, a multiplier having a lever connected to the turning lever through a brake operating linkage, a piston having a drain hole open to a pressure chamber and contacted with a brake lever of a brake body at the end thereof and a rod for opening and closing the drain hole of the piston by movement of the lever, a brake cylinder connected to the brake operating linkage so as to be operated by the urging force of the spring only when the supply of compressed air is shut off, and a slow turning valve connected to the hydraulic circuit from a brake booster communicating with the pressure chamber of the multiplier for varying the relief set pressure by the supply of compressed air.

According to another aspect of the present invention, there is provided a slow turning valve for the steering device of a wireless tractor control having a multiplier in which a lever is connected to a turning lever through a brake operating linkage, a piston having a drain hole is open to a pressure chamber and contacts a brake lever of a brake body at the end thereof, and a rod is provided for opening and closing the drain hole of the piston by movement of the lever. A valve seat member engages at one end with a hydraulic circuit from a brake booster communicated with the pressure chamber of the multiplier and has a cutout hole communicating with the drain port of a valve box and the hydraulic circuit, and a valve body is slidably engaged within the valve seat member and is urged to the valve seat side of the valve seat member by a spring supported from the valve box side at one end thereof. A piston is urged into contact with the end surface of the valve body by a spring and is so engaged with the valve box as to move against the spring by means of the compressed air from the port of the valve box.

BRIEF DESCRIPTION OF THE DRAWINGS

These and other objects, features and attendant advantages of the present invention will be more fully appreciated as the same becomes better understood from the following detailed description when considered in conjunction with the accompanying drawings, wherein like reference numerals designate like or corresponding parts throughout the several views, and in which.

DETAILED DESCRIPTION OF THE PREFERRED EMBODIMENT

Figure 1:
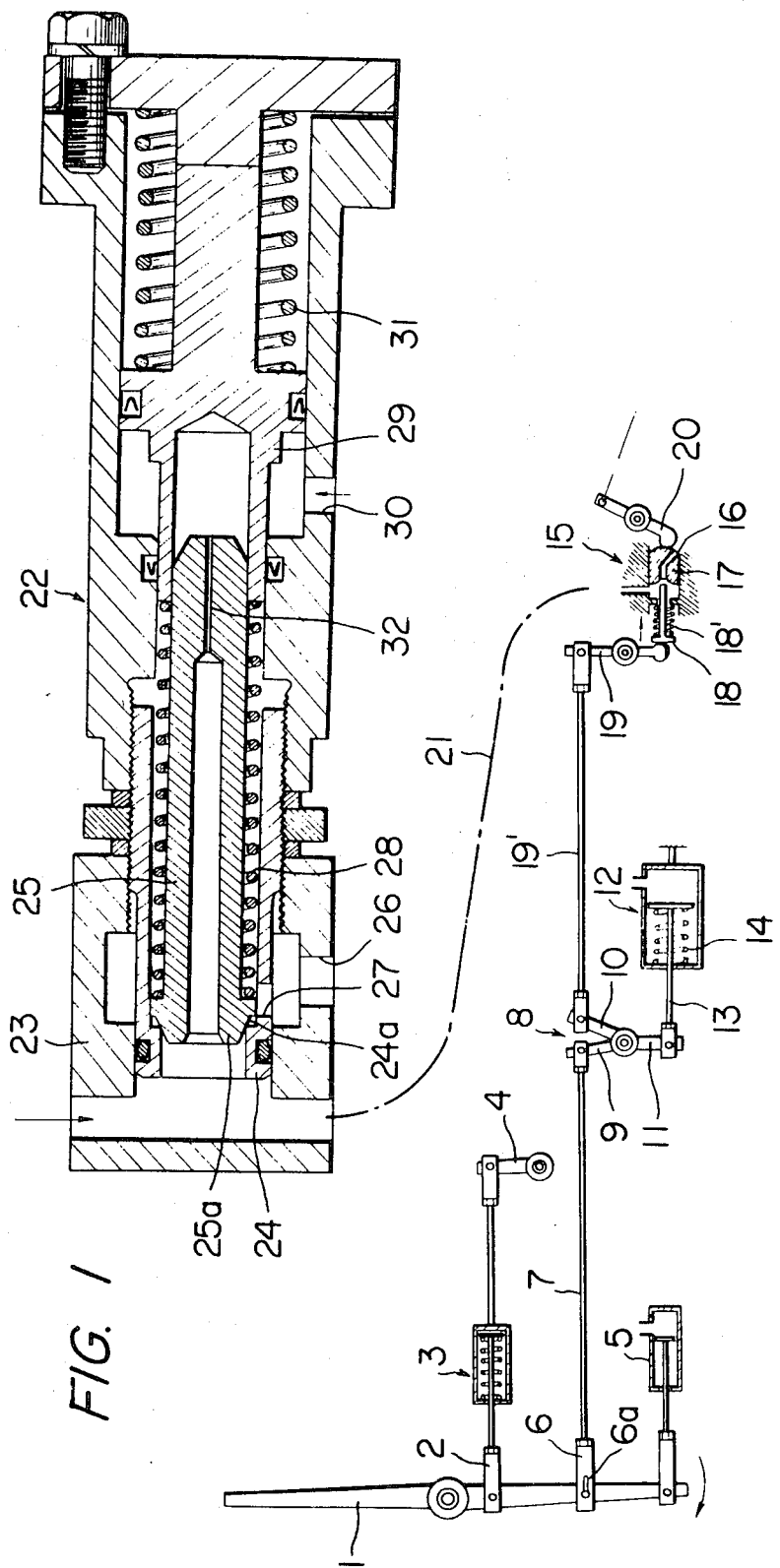
FIG. 1 is a schematic view of a steering device of a wireless tractor control with a slow turning valve being shown in section constructed according to the present invention.

Referring now to the drawings and more particularly to FIG. 1, which shows one embodiment of a steering device of a wireless tractor control having a slow turning valve shown in section and constructed according to the present invention, the reference numeral 1 represents one turning lever for use when right and left steering devices are manually operated, the lever 1 being connected through a yoke 2 and a loose spring 3 to the clutch lever 4 of a steering clutch, not shown, and having connected thereto a pneumatic cylinder 5 operated by compressed air from a suitable source. The compressed air supplied to the pneumatic cylinder 5 is switched from a shut-off condition to an operable connection, or vice versa, by a change-over valve, not shown, operated by a wireless control. The turning lever 1 is also connected to a yoke 6 having a long hole 6a, through the hole 6a, which yoke 6 is connected through a rod 7 to the lever 9 of a brake operating linkage generally designated by the numeral 8. The brake operating linkage 8 has a lever 10 and a lever 11 in addition to the lever 9, which are so connected that when the lever 9 is rotated, only the lever 10 is integrally operated, but the other lever 11 is not operated, while when the lever 11 is rotated, the other two levers 9 and 10 are integrally operated. The lever 11 of the linkage 8 is connected to the piston rod 13 of a brake cylinder 12. A spring 14 is mounted in the brake cylinder 12 so that it is extended or contracted by the compressed air for thereby moving the piston rod 13.

A multiplier 15 is operated by hydraulic pressure and comprises a piston 17 having a drain hole 16 formed therein opened at the center thereof and slidably inserted thereinto, a rod 18 slidably inserted therethrough opposite to the piston 17 through a spring 18' for opening and closing the drain hole 16 of the piston 17, a lever 19 connected at one end thereof to one end of a rod 19' connected at the other to the lever 10 of the linkage 8 for operating the rod 18, and a brake lever 20 pivotally contacted with the piston 17 to be operated by the piston 17, to which lever 20 is connected a brake body (not shown).

On the other hand, the head portion of the piston 17 of the multiplier 15 communicates through the hydraulic circuit 21 with a brake booster, not shown, and with a slow turning valve generally designated by the reference numeral 22.

This slow turning valve 22 comprises, as shown, a valve box 23 having a valve seat member 24 axially adjustably engaged therewithin and communicated at one end with the hydraulic circuit 21 and having a valve body 25 slidably engaged within the valve seal member 24 so that an end valve portion 25a of the valve body 25 is disposed opposite an inner valve seat portion 24a of the valve seat member 24. The valve seat member 24 has a cut-out hole 27 for communicating a drain hole 26 of the valve box 23 with the hydraulic circuit 21. A spring 28 for urging the valve body 25 toward the valve seat 24a side surrounds the valve body 25 and acts between a shoulder on the valve body and a piston 29 disposed at one end of the valve body. The piston 29 is operative to move in a direction to weaken the urging force of the spring 28 for urging the valve body 25 when compressed air flows into the port 30, but this movement of the piston 29 is also controlled by another spring 31 disposed between the opposite end of the piston and the opposite end wall of the valve box.

The supply or shut-off of the compressed air for the port 30 is switched by a change-over valve, not shown, operated by a wireless control similar to the case where the valve operates the pneumatic cylinder 5 and the brake cylinder 12 as described heretofore.

A fine axial hole 32 is provided for preventing chattering in the axial center of the valve body 25, and the urging force of the hydraulic oil of the hydraulic circuit 21 acts slightly on the rear surface of the valve body 25. The spring 31 for urging the piston 29 has enough tension not to be affected by the urging force of the hydraulic oil for preventing such chattering.

In the operation of a steering device for the wireless control tractor constructed as described herein, when the tractor is operated by a wireless control, pneumatic pressure is applied to the brake cylinder 12 to overcome the urging force of the spring 14, and at the same time compressed air is supplied to the port 30 of the slow turning valve 22 to move the piston 29 rightwardly, as shown in the drawing, against the spring 31 to set the force set by the spring 28 for urging the valve body 25 to a low amount. The compressed air acts on the pneumatic cylinder 5 in this state, so as to slowly turn the tractor.

More particularly, if the compressed air is actuated in the pneumatic cylinder 5, the turning lever 1 is pivotally moved, as designated by an arrow in FIG. 1, with the result that the steering clutch is disengaged at first through the clutch lever 4. The rod 18 slidably moves, as designated by an arrow in the drawing, through the levers 9 and 10 of the brake operating linkage 8 and the lever 19 of the multiplier 15 upon operation of the turning lever 1, so as to close the drain hole 16 of the piston 17, whereby hydraulic oil from the brake booster acts upon the piston 17 with the result that the brake lever 20 also is acted upon by the hydraulic pressure at this same time. In this case, the link 11 of the linkage 8 is not rotated pivotally, and the piston rod 13 of the brake cylinder 12 is not operated.

Since the urging force of the spring 28 for urging the valve body 25 of the slow turning valve 22 is weakened as the piston 29 is moved by the pneumatic pressure from the port 30, at this time, the relief set pressure of the slow turning valve 22 becomes low, and accordingly the pressure for operating the piston 17 of the multiplier 15 also becomes low so that the brake gradually operates to turn slowly the tractor.

On the other hand, if the supply of compressed air to the brake cylinder 12 is shut off in the above case, the piston rod 13 of the brake cylinder 12 is returned by the spring 14 so as to urge the piston 17 of the multiplier 15 by the urging force of the spring 14 in order to abruptly brake the tractor to cause it to quickly turn. In this case, the lever 9 of the linkage 8 is also pivotally moved by the movement of the piston rod 13, but this movement escapes and is not effective because of the long hole 6a in the yoke 6.

Then, when the tractor is manually steered, compressed air is supplied only to the brake cylinder 12, and after the supply of compressed air to the other pneumatic cylinder 5 and the slow turning valve 22 is shut off, the turning lever 1 is operated. The brake speed or the turning speed at this time may be controlled by the drawing manner of the turning lever 1.

The hydraulic pressure for actuating the piston 17 of the multiplier 15 at this time is almost not affected by the slow turning valve 22 because the relief set pressure of the slow turning valve 22 becomes high, but the hydraulic pressure from the brake booster directly acts as a reinforcement for the brake operating force to reduce the manual operating force.

Figure 2:
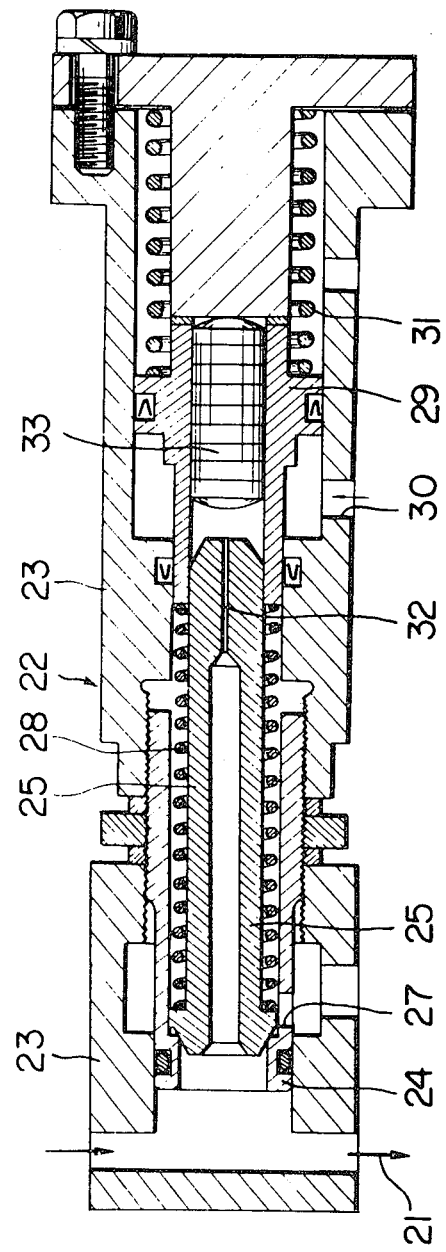
FIG. 2 is a sectional view of another embodiment of a slow turning valve for the steering device of the present invention.

Reference is now made to FIG. 2, which shows another embodiment of the slow valve used for the steering device of this invention.

When there is not enough space provided for mounting the spring 31 due to the sizes of the valve box 23 and the piston 29, a support member 33 is engaged within the piston 29 so that the urging force of the hydraulic oil for preventing chattering may not compress the spring 31.

It is understood that this embodiment shows only one of the right and left steering devices of the tractor, and that there is another one in addition thereto.

It should be understood from the foregoing description that since the steering device of a wireless controlled tractor is so constructed as to comprise a turning lever 1, a steering clutch connected to the turning lever 1 through a loose spring 3, a pneumatic cylinder 5 connected to the turning lever 1, a multipler 15 having a lever 19 connected to the turning lever 1 through a brake operating linkage 8, a piston 17 having a drain hole 16 opened to a pressure chamber and contacted with a brake lever 20 of a brake body at the end thereof and a rod 18 for opening and closing the drain hole 16 of the piston 17 by movement of the lever 19, a brake cylinder 12 so connected to the brake operating linkage 8 as to operate by the urging force of the spring only when the supply of compressed air is shut off, and a slow turning valve 22 connected to the hydraulic circuit 21 from the brake booster communicating with the pressure chamber of the multiplier 15 for varying the relief set pressure by the supply of the compressed air, the tractor may turn quickly and slowly in a manner similar to that of a manual control, even upon wireless control, so as to remarkably improve the wireless control of the tractor. It should also be understood that since the slow turning valve does not affect the control of the tractor, or the manual operation thereof, and the hydraulic pressure from the brake booster is directly operated as a reinforcement of the brake operating force, the manual operating force may be reduced so as to lessen the fatigue of the operator of the tractor.

Figure 3:
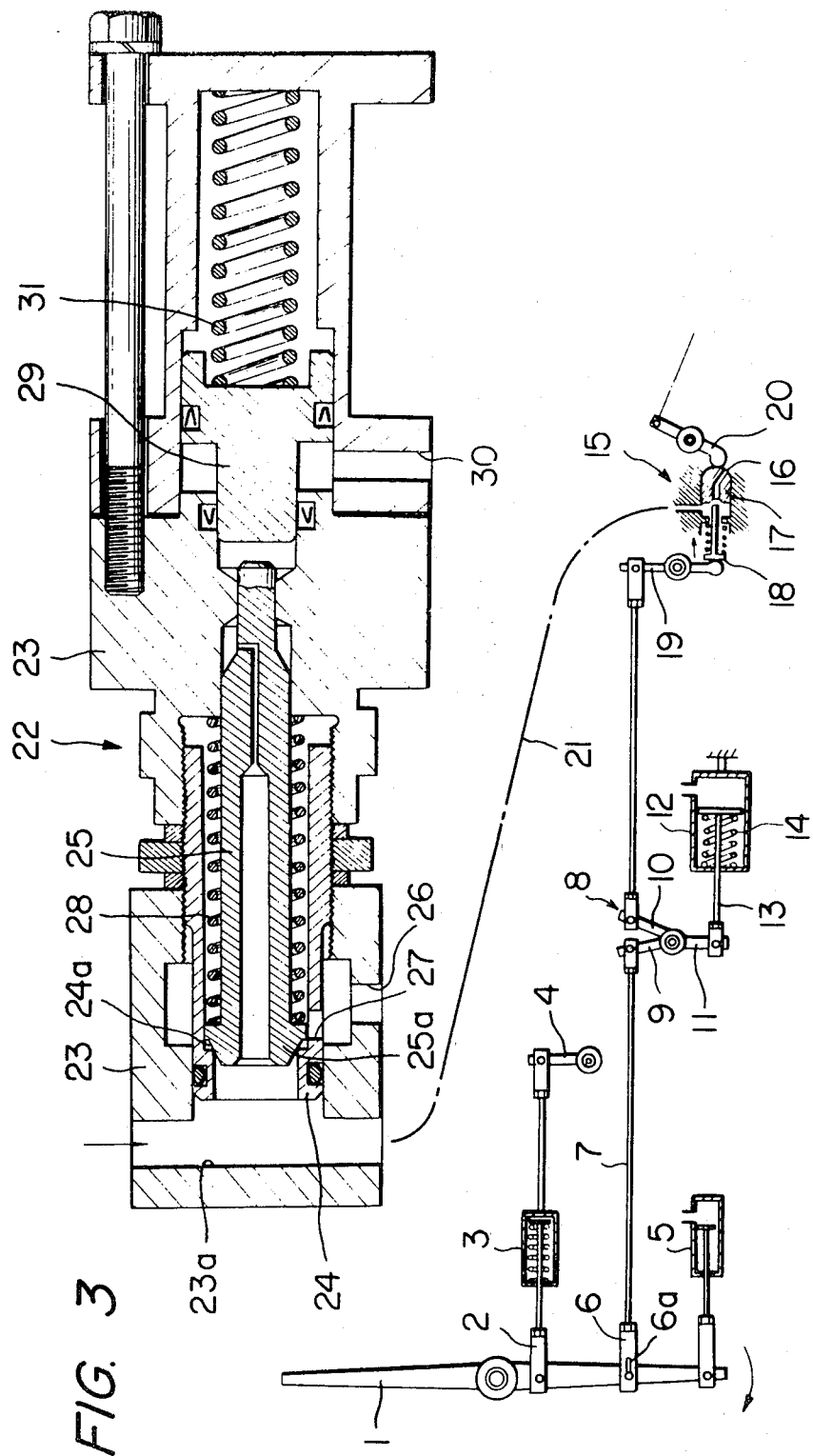
FIG. 3 is a sectional view of still another embodiment of the slow turning valve for the steering device constructed according to the present invention.

Referring now to FIG. 3, which shows still another embodiment of the slow turning valve used for the steering device of the wireless tractor control constructed in accordance with the present invention, a port 23a communicates with the hydraulic circuit 21 which communicates with the brake booster. A piston 29 is slidably inserted into the valve box 23 opposite the other end of the valve body 25 at one end, and is urged by a spring 31 toward the valve body 25 side. This piston 29 is moved opposite to the valve body 25 against the spring 31 by compressed air from the port 30.

The slow turning valve 22 of this embodiment operates almost the same as those embodiments heretofore described, except that when the turning lever 1 is pivotally moved as designated by an arrow, since the piston 29 of the slow turning valve 22 is moved against the spring 31 by the compressed air from the port 30 to be spaced from the end surface of the valve body 25, the urging force of the valve body 25 is provided only by the spring 28 so that the set pressure is reduced, with the result that the relief set pressure within the hydraulic circuit 21 is set to a lower value, and accordingly the pressure acting on the piston 17 of the multiplier 15 becomes low, and the brake thus operates gradually so as to sowly turn the tractor.

The operation of the slow turning valve constructed according to this embodiment also is similar to the aforementioned operation of the previous embodiments, but in its manual operation, since the supply of the compressed air to the slow turning valve 22 is then shut off, the piston 29 moves leftwardly as seen in the drawing so that the urging force of the spring 31 acts against the valve body 25 through the piston 29, and therefore its relief set pressure increases so as to increase the hydraulic pressure of the piston 17 of the multiplier 15, with the result that this hydraulic pressure reinforces the brake operating force so as to reduce the manual operating force.

It should be understood from the foregoing description that since the slow turning valve thus constructed to comprise a valve seat member 24 engaged at one end thereof with a hydraulic circuit 21 from a brake booster communicating with the pressure chamber of the multiplier 15 and having a cutout hole 27 communicating with the drain port 26 of a valve box 23 and the hydraulic circuit 21, a valve body 25 slidably engaged within the valve seat member 24 and urged against the valve seat 24a side of the valve member 24 by a spring 28 supported by the valve box 23 side at one end thereof, and a piston 29 urged in contact on the end surface of the valve body 25 by a spring 31 and so engaged with the valve box 23 as to move against the spring 31 by the compressed air from the port 30 of the valve box 23, the relief set pressure in the case where the compressed air is supplied from the port 29, that is, at a wireless control, is determined only by the spring 28 for urging the valve body 25, and is set to a very low value, and the relief set pressure in the case where the supply of the compressed air is shut off for manual operation may be set to a large pressure by the spring 31 for urging the piston 29. It should also be understood that the relief set pressure for the wireless control of the tractor may be easily varied by changing only the tension of the spring 28.

Obviously many modifications and variations of the present invention are possible in light of these teachings. It is therefore to be understood that within the scope of the appended claims, the present invention may be practiced otherwise than as specifically described herein.

What is claimed as new and desired to be secured by Letters Patent of the United States is:

1. A steering device of a wireless control tractor comprising:

a turning lever;

a steering clutch connected to said turning lever through a loose spring;

a pneumaatic cylinder connected to a source of compressed air and to said turning lever for actuating said turning lever and disengaging said steering clutch in response to pneumatic pressure being supplied to said pneumatic cylinder as a result of said wireless control;

a multiplier having a lever connected to said turning lever through a brake operating linkage and adapted to be operated by said turning lever when said turning lever is actuated by said compressed air;

piston means within said mutiplier having a drain hole open to a pressure chamber and contacted with a brake lever of a brake body at one end thereof and a rod for opening and closing the drain hole of said piston means by movement of said multiplier lever;

a spring-biased brake cylinder connected to said brake operating linkage and to said source of compressed air so as to operate said multiplier lever and said rod through means of said brake operating linkage under the tension of said spring only when the supply of said compressed air is shut off; and slow turning valve means connected to a hydraulic circuit extending from a brake booster and communicating with the pressure chamber of said multiplier and to said compressed air source, for varying the relief set pressure of hydraulic fluid passing through said valve means and being supplied to said multiplier and said brake body between a high value when said supply of compressed air is terminated and a low value when said compressed air is supplied, whereby said tractor will be rapidly turned when said high pressure fluid is supplied to said multiplier and brake body and will be slowly turned when said low pressure fluid is supplied to said multiplier and brake body.

2. A slow turning valve of a steering device of a wireless control tractor in which a multiplier having a lever is connected to a turning lever through a brake operating linkage, a piston within said multiplier having a drain hole open to pressure chamber is contacted with a brake lever of a brake body at the end thereof and a rod thereof is provided for opening and closing the drain hole of said piston upon movement of said multiplier lever, the improvement comprising:

a valve seat member engaged at one end thereof with a hydraulic circuit extending from a brake booster and communicating with the pressure chamber of said multiplier, said valve seat member having a cutout hole communicating with a drain port of a valve box and the hydraulic circuit;

a valve body slidably engaged within said valve seat member and urged to the valve seat side of said valve seat member by a first spring supported in the valve box side at one end thereof; and a valve piston urged in contact with the end surface of said valve body by a second spring and engaged with said first spring and the valve box so as to move against the second spring by means of compressed air being supplied in response to said wireless control to an air supply port of said valve box so as to reduce the tension within said first spring and thereby permit said valve body to move away from said valve seat under the influence of said hydraulic fluid and thereby uncover said cutout hole and drain port thereby reducing the pressure of said hydraulic fluid within said hydraulic circuit leading to said multiplier and brake body, whereby high and low pressure fluid is conducted through said valve, in response to said supply or termination of said compressed air so as to rapidly or slowly turn said tractor.

3. A steering device as set forth in claim 2, wherein said slow turning valve comprises a support member engaged within said valve piston.

* * * * *